3,423,356
POLYMER COMPOSITIONS COMPRISING THE REACTION PRODUCTS OF POLYEPISULPHIDES AND PHENOLIC RESINS
John L. Smith, Coleshill, and Reginald D. Singer, Birmingham, England, assignors to The Dunlop Company Limited, London, England, a British company
No Drawing. Filed July 6, 1966, Ser. No. 563,022
Claims priority, application Great Britain, July 23, 1965, 31,462/65; Mar. 16, 1966, 11,412/66
U.S. Cl. 260—32.8      26 Claims
Int. Cl. C08g *43/02*

ABSTRACT OF THE DISCLOSURE

A mixture of a major proportion of (A) a polymer of at least one alkylene episulphide having at least two reactive terminal groups with a minor proportion of (B) a potentially thermosetting phenolic resin or with (C) a phenolic compound and an aldehyde or a compound which decomposes on heating to liberate an aldehyde, the phenolic compound and the aldehyde being capable of reacting together to form a potentially thermosetting phenolic resin.

---

This invention relates to polymer compositions and particularly to polymer compositions comprising a polymer of one or more episulphides, and to a process for the preparation of reaction products of a polymer of one or more episulphides.

According to the present invention also, a process composition comprises a mixture of (A) a polymer of one or more episulphides having at least two reactive terminal groups with (B) a potentially thermosetting phenolic resin or with (C) a phenolic compound and an aldehyde or a compound which decomposes on heating to liberate an aldehyde, the phenolic compound and the aldehyde being capable of reacting together to form a potentially thermosetting phenolic resin.

According to the present invetnion also, a process comprises mixing (A) a polymer of one or more episulphides having at least two reactive terminal groups with (B) a potentially thermosetting phenolic resin or (C) a phenolic compound and an aldehyde or a compound which decomposes on heating to liberate an aldehyde, said phenolic compound and said aldehyde being capable of reacting together to form a potentially thermosetting phenolic resin, and heating the mixture so obtained and allowing said polymer of one or more episulphides to react with said phenolic resin or with said phenolic compound and said aldehyde.

The reaction products of the present invention are produced in either of two ways. In the first way the polymer of one or more episulphides is mixed directly with a potentially thermosetting phenolic resin and reacted. In the second way the polymer of one or more episulphides is mixed with the materials that are capable of reacting together to form a potentially thermosetting resin and the mixture is allowed to react.

The phenolic resins (B) which may be used in the present invention are the potentially thermosetting resins containing phenolic —OH groups obtained by reacting a phenolic compound with an aldehyde. The phenolic compounds and the aldehydes (C) which may be used in the present invention are those capable of reacting together to form potentially thermosetting resins containing phenolic —OH groups. These resins are commonly known as phenol-aldehyde resins, and the commonest members of the group are the phenol-formaldehyde resins. The phenolic resin (B) can be formed from, or the phenolic compound in (C) can be phenol itself ($C_6H_5OH$), a cresol, a xylenol, resorcinol, or an alkylated phenolic compound, and the aldehyde used to form (B) or in (C) can be an aldehyde such as paraformaldehyde but preferably is formaldehyde. An example of a compound which decomposes on heating to liberate an aldehyde is hexamethylene tetramine which yields formaldehyde. The reaction between phenolic compounds and aldehydes to produce a phenolic resin is a general reaction, and takes place with the evolution of water. However, it is believed that the phenolic —OH groups are unaffected by the reaction and are present in the resin products.

The polymer of one or more episulphides has at least two reactive terminal groups which may be, for instance, amino groups, thiol groups, hydroxy groups or epoxy groups. A method for the preparation of suitable polymers is described in Adamek et al. U.S. Patent No. 3,325,456, in which there is described a process for the preparation of a polyepisulphide which comprises polymerizing one or more episulphides in the presence of a polymerization catalyst being a compound of a metal of the B sub-group of Group II of the Mendeleeff Periodic Table and a co-catalyst being ammonia, an inorganic ammonium compound, an organic amine, hydrazine or a derivative of hydrazine. The resulting polymer has a terminal —SH group and another reactive terminal group which will usually be an amino group. The episulphide that is polymerized can be any aliphatic episulphide and copolymers of two or more episulphides can be prepared. Typical episulphides are alkylene episulphides such as ethylene episulphide, propylene episulphide and butylene episulphide.

The polymer of one or more episulphides can have a molecular weight of greater than 10,000, but it is preferred to use a polymer having a molecular weight of less than 3,500. The polymer will usually be a liquid of low viscosity, but polymers of high viscosity or even solid polymers can be used in the form of a solution in an organic solvent therefor. Suitable organic solvents are hydrocarbons such as benzene and toluene, chlorinated hydrocarbons such as chlorobenzene and chloroform, and carbon tetrachloride. The amount of the solvent is not critical and amounts of up to 300 parts by weight per 100 parts of the polymer can be used. It may in certain cases be advantageous to use the composition in the presence of a solvent to produce a polymer composition which has a low viscosity and which can be painted or sprayed on to a surface to form a protective coating on the surface. The viscosity of such a polymer composition can readily be adjusted by adding solvent to, or removing solvent from the composition, as desired.

The phenolic resins which may be used are potentially thermosetting, i.e. they can be cross-linked and caused to set by heating them. The phenolic resin, or the phenolic compound and the aldehyde are preferably used in solutions. The amount of the phenolic resin used is not critical, but will usually be from 0.5 part to 5 parts by weight per part of the polymer of one or more episulphides. The amounts of the phenolic compound and the aldehyde used as (C) are usually such that they are equivalent to that required for the formation of from 0.5 part to 5 parts of a potentially thermosetting resin per part of the polymer of one or more episulphides.

The blending of the polymer of one or more episulphides and the other reactants (B) or (C) is usually carried out at room temperature, and it is preferred to use thee composition so obtained at room temperature and subsequently heat the composition to an elevated temperature, for example from 140° C. to 180° C., to effect final cross-linkage of the composition. In the case where an aldehyde generator is employed then it is necessary to heat the composition to effect generation of the aldehyde.

The reaction between the polymer of one or more episulphides and reactant (C) is preferably carried out in the presence of a catalyst to accelerate the reaction. The chemical nature of the catalyst will depend to some extent upon the relative proportions of the phenolic compound and the aldehyde in the reaction mixture. Usually the aldehyde will be present in stoichiometric excess, so that if carried out in the absence of the polymer of one or more episulphides, the product would contain a thermosetting resin of the type known as "resols." In this case a basic catalyst is used, and examples of suitable basic catalysts are ammonia and sodium hydroxide. Alternatively, the phenolic compound may be present in stoichiometric excess so that the product would contain, in the absence of the polymer of one or episulphides a resin which is not itself thermosetting but which can be converted to a thermosetting resin by the addition of a further amount of aldehyde. This type of resin is known as "novolak" resin. In this case the catalyst used to prepare the initial resin will be an acid catalyst such as hydrochloric acid. A basic catalyst could be used to accelerate the reaction between an initial resin of this type and a further amount of an aldehyde.

The amount of the catalyst is not critical but will usually be from 0.5 part to 5.0 parts by weight based on the total weight of the phenolic compound and the aldehyde.

The reaction products of the invention have good heat-resistance properties and can be used with advantage to provide protective coatings to articles of metal, wood, textiles, paper and a variety of other articles. The compositions can be spread, painted or sprayed on to the surface to be coated, and allowed to dry to form the protective coating. As hereinbefore explained, it is preferred to heat the composition to about 160° C. to effect final cross-linkage thereof.

The polymer compositions can also be used as adhesive compositions, in which case the compositions are applied between the surfaces to be adhered together, for instance, both of the surfaces can be coated and the coated surfaces pressed into contact. The composition is then dried, and preferably heated to about 160° C.

The invention is illustrated by the following examples, in which all "parts" are parts by weight:

EXAMPLE I 1.0 part of a liquid poly(propylene episulphide) having a molecular weight of 1040 and having one terminal thiol group and one terminal amino group was mixed with 1.0 part of a spirit-soluble phenol-formaldehyde resin available under the trade name Resin 5363 used in the form of a 50 percent w./w. solution in acetone. The mixture was sprayed on to the surface of a mild-steel panel and was then allowed to dry at room temperature. The coated panel was then heated at 160° C. for 50 minutes, after which time it was cooled and the following physical properties of the coating were determined.

Pencil hardness

Resistance to sodium hydroxide solution.—The coated mild-steel panel was immersed in a 5 percent aqueous solution of sodium hydroxide for 92 hours.

Resistance to salt spray.—The coated mild-steel panel was subjected to a spray of a 5 percent aqueous solution of salt for 14 days. The spreading of rust on the surface of the metal (rust creep) was also noted.

The results of the test are given in Table I below.

The above procedure was repeated twice (Experiments 2 and 3) using 1.5 parts and 2.0 parts, respectively, of the phenolic resin instead of 1.0 part.

The above three experiments were then repeated (Experiments 4, 5 and 6) except that in each case the phenolic resin was replaced by another phenolic resin available under the trade name Resin R14634/1.

The results are shown in Table I below, in which "hardness" is expressed as pencil hardness:

TABLE I

| Test | Experiment No. | | | | | |
| --- | --- | --- | --- | --- | --- | --- |
| | 1 | 2 | 3 | 4 | 5 | 6 |
| Hardness | H | 3H | 3H | B | 2H | 3H |

The film obtained from Experiment No. 1 was slightly softened by immersion in the solution hydroxide solution, and became slightly discoloured. The films from Experiments Nos. 2 to 6 were not softened nor discoloured by the sodium hydroxide solution.

No general corrosion of the mild-steel plate coated in Experiments Nos. 1 to 6 was observed in the salt-spray test, but the films from Experiments 3, 5 and 6 allowed slight rust creep (about 1/16 inch).

EXAMPLE II 2.0 parts of a phenol-formaldehyde resin available under the trade name Resin 5363 were mixed with 1.0 part of a liquid poly(propylene episulphide) having a molecular weight of 1040 and having one terminal thiol group and one terminal amino group. The phenolic resin was used in the form of a 50 percent w./w. solution in acetone.

The mixture was sprayed on to the surface of a mild-steel panel and was dried and heated as described in Example I.

The experiment was then repeated twice (Experiments 2 and 3) using, respectively, 1.0 part of a poly(propylene episulphide) of molecular weight 1810, and 1.0 part of a poly(propylene episulphide) of molecular weight 3000 instead of the poly(propylene episulphide) of molecular weight 1040.

The pencil hardness of each film is shown in Table II.

TABLE II

| | Experiment No. | | |
| --- | --- | --- | --- |
| | 1 | 2 | 3 |
| Pencil hardness | 3H | 4H | 4H |

Each film was subjected to the tests with sodium hydroxide solution and salt solution described in Example I.

The film from Experiment 1 was not affected by the sodium hydroxide solution, and no general corrosion of the panel was observed in the salt-spray test. However, rust creep of 1/16 inch was observed in the salt solution test.

The films from Experiments 2 and 3 showed small areas of discoloration in the sodium hydroxide solution test, but no general corrosion and no rust creep was observed in the salt-spray test.

EXAMPLE III

The following ingredients were mixed in a glass reaction vessel (flask).

| | Parts |
| --- | --- |
| Phenol | 94.0 |
| Formalin (37 percent formaldehyde) | 87.0 |
| Ammonia (0.880) | 7.5 |
| Poly(propylene sulphide) | 38.0 |

The poly(propylene sulphide) had a molecular weight (ebullioscopic) of 497 and contained one amino and one thiol group per molecule.

The mixing was carried out as follows. The phenol, formalin and the poly(propylene sulphide) were added to the reaction vessel at room temperature. The flask was heated and after 10 minutes the temperature of the mixture was 50° C. The mixture at this stage was fluid. The ammonia was added and after a further 10 minutes the mixture began to reflux (95° C.) and the reflux conditions were maintained for a further 40 minutes after which time heating was ceased. The mixture was allowed to cool to 56° C. over a period of 15 minutes, and the flask was then connected to a vacuum-pump. Heating was then recommenced and the temperature of the mixture was raised to 100° C. over a period of 50 minutes. After this time removal of water from the system had ceased. The flask was then disconnected from the vacuum-pump and the mixture was heated at a temperature of 100° C. to 105° C. for a further 20 minutes, after which time it was allowed to cool to room temperature.

The resulting viscous product was dissolved in a mixture of ethanol and xylene (90/10 ethanol/xylene) to give a 50 percent w./w. solution of the product. Films were cast from the solution on mild-steel panels, and the coated panels were then air-dried and heated (stoved) in an air-oven at 160° C. for 30 minutes.

The following physical properties of the films were then determined:

Hardness (pencil hardness)

Flexibility.—The films were regarded as passing this test if they could be bent around a ⅜ inch mandrel without flaking or cracking.

Resistance to salt-spray.—The film adhered to the mild-steel panel was sprayed with a 5 percent aqueous solution of salt for 14 days.

Resistance to caustic soda.—The film adhered to the mild-steel panel was immersed in a 5 percent aqueous solution of sodium hydroxide. The time of this treatment is shown with the result in the table below.

In a further test a film of the solution was cast on a tin plate which was stoved as above and then bent to form a cylinder. The open seam was then soldered and the cylinder was examined to determine the effect on the film of the heat of the soldering operation.

The above procedures were repeated (Experiment No. 2) except that the poly(propylene sulphide) of molecular weight 497 was replaced by 38.0 parts of poly(propylene sulphide) of molecular weight (ebullioscopic) 606 having one thiol and an amino end group per molecule.

The procedures of Experiment No. 1 were again repeated (Experiment No. 3) except that 63.3 parts of the poly(propylene sulphide) were used instead of 38.0 parts, and the distillation under vacuum was continued for 2 hours instead of 50 minutes.

TABLE

| Property | Experiment No. | | |
|---|---|---|---|
| | 1 | 2 | 3 |
| Hardness (pencil) | 5H | 4H–5H | 5H. |
| Flexibility | Pass | Pass | Pass. |
| Salt spray | Unaffected | Unaffected | Unaffected. |
| Sodium hydroxide | No effect after 4 hours. | No effect after 4 hours. | No effect after 4 hours. |
| Soldering | No effect | No effect | No effect. |

In a further test the effect on the films of conventional paint stirppers based on methylene chloride was determined. The films in Experiments 1 and 2 were not softened by the paint stripper. The film in Experiment 3 was softened to some extent but could not be readily removed from the mild-steel panel.

EXAMPLE IV

A paint was prepared from the following ingredients:

| | Parts |
|---|---|
| Poly(propylene episulphide) (mol. wt. 600) | 10 |
| Spirit soluble phenol-formaldehyde resin (Resin 5363) 50 percent solution in acetone | 20 |
| Rutile titanium dioxide | 20 |
| Acetone | 7 |

The poly(propylene episulphide) contained one thiol and one amino end group per molecule. This mixture was passed rapidly three times through a triple-roll mill and diluted to a suitable spraying viscosity with acetone. Painted panels were air-dried and subsequently stoved for 30 minutes at 160° C. The resultant coatings were hard, glossy and yellow in colour. The coating was not attacked by 5 percent sodium hydroxide solution after 92 hours immersion and showed excellent resistance to 14 days exposure to salt spray.

Having now described our invention, what we claim is:

1. A polymer composition which comprises a mixture of a major proportion of (A) a polymer of at least one alkylene episulphide having at least two reactive terminal groups with a minor proportion of (B) a potentially thermosetting phenolic resin or with (C) a phenolic compound and an aldehyde or a compound which decomposes on heating to liberate an aldehyde, the phenolic compound and the aldehyde being capable of reacting together to form a potentially thermosetting phenolic resin.

2. A polymer composition according to claim 1 in which the potentially thermosetting phenolic resin has been formed from a phenol and an aldehyde.

3. A polymer composition according to claim 2 in which the aldehyde is formaldehyde.

4. A polymer composition according to claim 1 in which the ingredients (C) comprise phenol and an aldehyde or an aldehyde-generating substance.

5. A polymer composition according to claim 4 in which the aldehyde-generaing substance is hexamethylene tetramine.

6. A polymer composition according to claim 1 in which the amount of the phenolic resin is about 0.5 part to 5 parts by weight per part of the polymer of at least one episulphide.

7. A polymer composition according to claim 1 in which the amount of the phenolic compound and the aldehyde or aldehyde-generating substance is that which is equivalent to that required for the formation of about 0.5 part to 5 parts by weight of a potentially thermosetting phenolic resin per part of the polymer of at least one episulphide.

8. A polymer composition according to claim 1 in which the polymer of at least one alkylene episulphide has at least one reactive terminal group selected from the class consisting of amino groups, thiol groups, hydroxy groups and epoxy groups.

9. A polymer composition according to claim 8 in which the polymer of at least one episulphide has a molecular weight of less than 3,500.

10. A polymer composition according to claim 1 which includes a solvent for said composition in an amount up to 300 parts by weight per 100 parts of the polymer of at least one episulphide.

11. A polymer composition according to claim 1, wherein said polymer (A) is selected from the group consisting of homopolymers and copolymers of at least one episulphide selected from the group consisting of ethylene episulphide, propylene episulphide and butylene episulphide.

12. A process which comprises mixing a major proportion of (A) a polymer of at least one alkylene episulphide having at least two reactive terminal groups with a minor proportion of (B) a potentially thermosetting phenolic resin or with (C) a phenolic compound and an aldehyde or a compound which decomposes on heating to liberate an aldehyde, said phenolic compound and said aldehyde being capable of reacting together to form the potentially thermosetting phenolic resin, and heating the mixture so obtained and allowing said polymer of at least one episulphide to react with said phenolic resin or with said phenolic compound and said aldehyde.

13. A process according to claim 12 in which the phenolic resin (B) has been formed from a phenol and an aldehyde.

14. A process according to claim 12 in which the ingredients (C) comprise a phenol and an aldehyde.

15. A process according to claim 14 in which the aldehyde is formaldehyde.

16. A process according to claim 12 in which the amount of the phenolic resin is about 0.5 part to 5 parts by weight per part of the polymer of at least one episulphide.

17. A process according to claim 12 in which the amount of the ingredients (C) are such as to be equivalent to that required for the formation of about 0.5 part to 5 parts of a potentially thermosetting resin per part of the polymer of at least one episulphide.

18. A process according to claim 12 in which the polymer of at least one episulphide has at least one reactive terminal group selected from the class consisting of amino groups, thiol groups, hydroxy groups and epoxy groups.

19. A process according to claim 18 in which said polymer has a molecular weight of less than 3,500.

20. A process according to claim 12 in which said polymer is dissolved in a solvent therefor.

21. A process according to claim 20 in which the solvent is present in an amount of up to 300 parts by weight per 100 parts of the polymer of at least one episulphide.

22. A process according to claim 12 in which the reaction of the polymer of at least one episulphide is reacted with the ingredients (C) in the presence of a catalyst to accelerate the reaction.

23. A process according to claim 22 in which the aldehyde is present in a stoichiometric excess and a catalyst is a basic catalyst.

24. A process according to claim 22 in which the phenolic compound is present in a stoichiometric excess and the catalyst is an acidic catalyst.

25. A process according to claim 23 in which the amount of the catalyst is from 0.5 part to 5 parts by weight based on the total weight of the phenolic compound and the aldehyde.

26. A process according to claim 12, wherein said polymer (A) is selected from the group consisting of homopolymers and copolymers of at least one episulphide selected from the group consisting of ethylene episulphide. propylene episulphide and butylene episulphide.

References Cited

UNITED STATES PATENTS

| | | | |
|---|---|---|---|
| 2,844,553 | 7/1958 | Taylor et al. | 260—51 |
| 3,074,897 | 1/1963 | Baker | 260—838 |
| 3,301,796 | 1/1967 | Herold | 260—79.7 |

FOREIGN PATENTS 909,842  11/1962  Great Britain.

MORRIS LIEBMAN, Primary Examiner.

L. T. JACOBS, Assistant Examiner.

U.S. Cl. X.R.

260—33.4, 33.6, 33.8, 57, 838